United States Patent [19]

Martin

[11] 4,038,427

[45] July 26, 1977

[54] PROCESS FOR PREPARING A DRIED AGGLOMERATED CEREAL MIXTURE

[75] Inventor: Thom O. Martin, Battle Creek, Mich.

[73] Assignee: General Foods Corporation, White Plains, N.Y.

[21] Appl. No.: 563,560

[22] Filed: Mar. 31, 1975

Related U.S. Application Data

[63] Continuation-in-part of Ser. No. 457,687, April 3, 1974, abandoned.

[51] Int. Cl.$^2$ .............................................. A23L 1/18
[52] U.S. Cl. ..................................... 426/285; 426/93; 426/307
[58] Field of Search .................. 426/93, 98, 96, 99, 426/103, 285, 307, 309, 618, 621, 625

[56] References Cited

U.S. PATENT DOCUMENTS

| | | | |
|---|---|---|---|
| 2,278,466 | 4/1942 | Musher | 426/305 X |
| 3,582,336 | 6/1971 | Rasmusson | 426/93 |
| 3,840,685 | 10/1974 | Lyoll et al. | 426/307 |
| 3,868,471 | 2/1975 | Decelles | 426/93 X |
| 3,876,811 | 4/1975 | Bonner et al. | 426/93 |

OTHER PUBLICATIONS

International Multi Foods, Minneapolis, Minn., Oct. 1973, entitled "Sun Country Granola".

*Primary Examiner*—Raymond N. Jones
*Attorney, Agent, or Firm*—Bruno P. Struzzi; Thomas V. Sullivan; Mitchell D. Bittman

[57] ABSTRACT

A natural, ready-to-eat breakfast cereal or snack product is produced by aggregating an assortment of amylaceous and proteinaceous particles around puffed and preferably at least partially cupped toasted cereal flakes which serve as focal points for the particles and thereby afford a multi-textured lower density and eating quality, the aggregates being preserved and agglomerated in a fat-syrup double or single coating.

25 Claims, No Drawings

PROCESS FOR PREPARING A DRIED AGGLOMERATED CEREAL MIXTURE

RELATED APPLICATIONS

This application is a continuation-in-part of U.S. Ser. No. 457,687 filed Apr. 3, 1974 now abandoned for CEREAL PROCESS AND PRODUCT.

BACKGROUND OF THE INVENTION

The present invention relates to improvements in the art of producing "natural" cereal and snack-type food products which are customarily aggregated as a plurality of assorted particles ranging from cereal grains to nutmeats and may also include fruit associated therewith. Such products have grown in popularity in the marketplace by reason of their representation of old fashioned and natural goodness; this manufacture stems in large measure from the ability to incorporate conventional cereal constituents such as rolled oats, wheat germ, and nutmeats such as almonds as well as dried coconut together with fats and oils which are flavorfully combined with less refined sugars such as dark brown sugar.

Whereas the earlier entry into the market in recent time was simply a dry blend of a good tasting crunchy cereal (e.g. granola), the esthetic organoleptic limitations of such a product have prompted others to endeavor to aggregate cereal components. This aggregation has taken the form of blends of cereal grain by-products having various eating textures but may accompanying disadvantages.

To illustrate, a forerunner in the current "natural" cereal market was a semi-agglomerated ready-to-eat cereal of rolled oats, brown sugar, wheat germ and flavors with raisins separately mixed; in lieu of raisins, other constituents such as coconut could be similarly mixed. Such semi-agglomeration was effected by means of a mixture of sugar syrup and defatted wheat germ which served to effect partial adhesion of the rolled oats into a relatively non-uniform, randomized distribution of agglomerates. This agglomerate is characterized by the rather prolonged period required for mastication and leaves an objectionable filling sensation after consumption.

Similar products whether high in rolled oats or in levels of fat, syrup or moisture have related limitations. Thus, an agglomeration of natural cereals may be comparatively dense and when possessing a high level of rolled oats or the like are prone to collect on and adhere to the crown of the tooth, particularly when eaten dry out-of-hand, an eating characteristic found objectionable by some.

It would be desirable to provide an agglomerated assortment of natural cereal and nutmeat particles which has a lower density and a unique texture that permits the product to be masticated with ease and in a relatively short period of time. The mouthful of such a product should advantageously occupy a spoonful without being inordinately high in density and leading to an uncomfortable filling sensation upon consumption.

In meeting these product requisites, it is desired and preferred object of the invention that the product be at packagable moisture contents whereat the effects of rancidity are not encountered. It is preferred to have a stable, crisp, less chewy agglomerated natural cereal product such as is afforded at moisture levels below 5% — say in the order of 2%, where the product also has an overall pleasant taste, both when eaten dry and when consumed upon liquid milk addition.

It is another object of the invention to provide moderate levels of fat and sugar to meet intended balanced recipe dictates while at the same time permitting aggregating techniques which provide a relatively complete and reasonably uniform agglomerate; a specific object of the invention is to provide a heterogeneous agglomerate which has a relatively uniform particle size. Agglomeration of prior natural cereal mixtures may provide random or erratic particle size distributions which may stem from the means of dry particles aggregation with amounts of fat and sugar. Then again, such products may assume a condition after packaging which is non-uniform, e.g. fine particles segregate to the bottom of the package with clusters of caked agglomerates collecting at the top due to disintegration during shipment of the packaged goods. Thus, it is an object of the present invention to provide a uniformly agglomerated cereal mixture which substantially retains its structure when packaged.

The term "cereal mixtures" herein connotes mixtures of whole grains and by-products such as oat, wheat, wheat germ, flours of like cereal origin and assorted natural balancing ingredients such as subdivided nutmeats, such as coconut and fortifying natural ingredients such as non-fat dry milk solids. In accordance with the present objects, such a mixture should be readily consumable and stable under normal packaging conditions against: premature oxidative rancidity; caking due to moisture uptake; and fragility in packaging; a stable storage period for purposes of the present invention would exceed 6 months at normal room temperature and preferably be at least 9 months.

SUMMARY OF THE INVENTION

In accordance with this invention, a cereal mixture which is fat-and sugar syrup coated is provided that meets the aforesaid objectives by including therein particles of puffed and toasted cupped flakes typically an oven-toasted rice flake produced by cooking pearled rice in a syrup solution, partially drying the rice, bumping it through flaking rolls and then oven puffing it by means conventional and known in the art; puffed toasted cereal flakes may be similarly produced from a variety of milled or semi-milled gelatinized rice and equivalent grains such as wheat and corn having the ability to puff readily and form upon flaking a cupped low density product that can be tackified and which will not lose its configuration and structure after wetting by the syrup. Broadly, the density of the puffed and toasted flake charge should be less than that of the balance of the cereal mixture combined. Preferably the toasted flake has a rehydration characteristic that causes adherence of the finer particles to the agglomerated mixture at spaced points of contact, the more powderous particles of said mixture being accumulated and nested in intimate association with the more delicate crisp flake. The nucleating flakes should preferably though not necessarily provide one or more of the following characteristics in accordance with the invention's prerequisites in bridging remaining particles of said mixture into a lower density multi-textured crisp comestible.

1. The toasted atmospheric, vacuum or otherwise puffed and toasted flakes should have a dextrinous surface which, when coated with an aqueous sugar syrup containing mono- and/or disaccharides, promotes adhesion of the dissimilar particles; it would appear the gelatinization of the starch and rupture of surface starch cells through cooking promotes an available readily rehydratable and activatable tackifying adhesive surface which facilitates the agglomeration process in an assortment of equipments ranging from a coating reel, a ribbon blender, or other mixers known in the art.

2. The flakes should be blistered and thereby provide an irregular surface area whereby the foregoing sticky adhesive nature of the flake surface becomes more functional, thus minimizing any tendency to experience unagglomerated farinaceous or proteinaceous particles as well as non-uniformly adhered particles which may be dislodged in packaging and thus lead to a segregated character.

3. The flake should be preferably distinctly cupped, i.e., curled into a convex form during the rolling or bumping operation to provide a pocket wherein remaining particles may collect incident to the tumbling action to which they are subjected during the agglomeration; this cupped character is believed to assure a uniform distribution of the dissimilar particles through a tumbling action and also provides protection against agglomerates initially formed breaking up during final coating operations, as will be described hereinafter.

4. The flake described hereinabove should absorb hot syrup faster than other dry blended ingredients whereby the flake itself serves as a focal point for the adhesion of particles of cereals and other balancing constituents inasmuch as the latter particles are less inclined to agglomerate per se; thus absorption of the syrup and the adhesion provided by the rice and equivalent starch surfaces provides preferential focal points upon which agglomerates collect or particles that are intended to form agglomerates are localized;

5. Some of the flakes should provide a pitted surface during blending of the above-specified flake and remaining ingredients of the cereal mixture, causing surface craters to exist, thus further optimizing the opportunity for adhesion of the dry ingredients or any individual agglomerates thereof which may be formed prior to stationing on the flake.

The degree of agglomerate formation will be demonstrated by the screen fraction evaluations that may be made of the finished agglomerated cereal mixture produced with varying degrees of mixing. In general, the greater the cupping of the flake the lesser will be the percent fine material that remains unagglomerated. Thus, it is believed that the cupped configuration permits greater control of agglomerate size and bulk density.

The foregoing functions of toasted flakes will occur to varying degrees depending upon the degree of gelatinization of the grain and the nature of the ingredients being commingled, some ingredients being more susceptible to the agglomeration tendencies of the nucleating flake than others. However, it is believed that all of these foregoing functions exist to some degree in a manner which provides a substantial reduction in density, uniformity of particles size distribution and a distinctive eating quality.

The agglomerates present a unique, multi-phased texture system in terms of eating quality; there is a sufficient quantity of the grain, grain by-products and nutmeat particles associated with the cereals to provide a crunchy "wholesome" mastication experience which has been associated with the common "granola-type" product; yet the presence of the nucleating puffed flakes provides a less filling, softer, more friable, easily pulverized and easily masticated crispy texture. This multi-texture system distinguishes it from the prior cereal mixtures discussed above and has been found definitely preferred by consumers who find a protracted mastication experience less preferable whether such products are consumed with milk or eaten dry from out of hand.

DETAILED DESCRIPTION OF THE INVENTION

To effect this eating quality, the level of puffed flakes used may range from 2% – 25% by weight of the dried agglomerate, preferably being in the order of 5% – 20%; the upper level of such flakes forms no distinct critical part of the invention, the amount being in some measure dictated by the remaining ingredients of the cereal mixture being agglomerated as well as the fat and syrup level used to coat the particles; there is, however, a practical upper limit — say, 25% — above which for a particular added fat-sugar level, due to the added surface area provided by the particular toasted flake, completed distribution of coating syrup cannot be readily obtained thereby providing an opportunity for oxidation sites which contribute towards instability; it is to be understood in this connection that the various fat-coated components of the cereal mixture including the puffed flakes will be substantially coated in the agglomerate by the sugar syrup solutes which, when a solution thereof is dried, provide a substantially continuous barrier against oxidative rancidity, an important property where latent "natural" enzymic and other rancidification activity is present in the cereals and nutmeats.

The tacky nature of the syrup when warm should promote sufficient initial aggregation to assure that clustering of particles occurs around the flake. Generally speaking, it will be a preferred embodiment of the invention that the syrup have a quantity of reducing micro-crystalline saccharidal constituents including dextrins and low molecular weight sugars, the syrup solids having a D.E. of at least 5; e.g., corn syrup in minor percent of the syrup solids; in this regard, a quantity of honey and corn syrup is preferably included for tackification; typically, reducing saccharidal materials or invert-type sugars may be employed all of which serve to enhance the aggregation of the particles as they undergo intimate contact.

Preferably also the charge material undergoing aggregation will be maintained at ambient room temperatures (68° F.) or in any event below 120° F. whereat better tackification will be occasioned by a given warmer syrup at a temperature above that of the charge material.

The stabilization mechanisms whereby an agglomerate is produced by drying the aggregate formed upon addition of the tackifying syrup are complex. Though the degree of gelatinization can be consequential, a significant amount of latent enzymic activity may be present in the remaining cereal components, e.g. the rolled oats and/or the bumped wheat farinaceous particles that are preferably used as the predominant parts of the cereal mixture; these cereals and their equivalents have a type of fat that is unsaturated and thus prone to undergo rancidification. An important factor in the present process is the use in a predominant (major) amount by weight of the added fat of a substantially saturated triglyceride fatty material such as coconut oil.

Less preferred alternative oil are palm, peanut and other saturated or unsaturated oils depending upon self stability requirements.

In this connection, the employment of 1% – 15% of amorphous mono-saccharides by weight of the sugar syrup solids is instrumental is achieving a semi-glossy, non-crystallizing coating which provides a substantially continuous barrier to oxidation.

In effecting agglomeration, a coating reel is the preferred means for promoting distribution of syrup. Pre-mixing of the dry blend ingredients to be agglomerated, the rate of rotation of the reel, the diameter thereof and the number of flights or baffles employed to promote a tumbling action are matters within the skill of art workers and form no part of the present invention. However, it is preferred in effecting a tumbling action to avoid excessive heating of the coating reel. Such low temperature processing promotes a good syrup distribution without premature moisture loss; a preferred embodiment is that the coating operation proceed at an ambient agglomerating temperature in the zone of aggregation below 120° F.; the syrup will be at a more elevated temperature — say, about 150° F. — whereat it will be fluid and evenly distributable and possess requisite stickiness.

The process used to produce the puffed and toasted flake is not a critical aspect of the invention in its broadest aspects. Typically, par-boiled milled white rice will be pressure cooked with a flavoring syrup whereupon the rice will be dried to a moisture content, say, in the order of 15% – 20% and then tempered for a prolonged period (e.g. 16 hours), whence it will be charged to a pre-heating oven to plasticize and warm the rice to a relatively high temperature to condition the rice for bumping. The rice will be bumped but not flaked to the point of producing a flattened non-resilient rice mass; the rice will be flattened to less than that condition wherein it loses its integrity as a grain per se; the bumped rice will thus assume a thickness dimension generally 50% – 75% of the cooked tempered rice dimension just prior to bumping. After bumping, the rice will be charged to a puffing oven where it will be blasted with heated air (450° – 500° F) at atmospheric conditions for a period of, say, 12-15 seconds to produce the characteristic puffed flake.

The preferred admixture of cereal grain components will include as at least 20% by weight of the dried agglomerated structure rolled oat groats and in the order of at least 2% by weight of a bumped rolled wheat. The agglomerated cereal mixture will generally contain at least 25% by weight of the bumped whole grain. The level of oats and wheat used will in some measure, of course, be dictated by nutritional requirements as well as palatability and other organoleptic considerations. Other cereal grains may be employed in lieu of oats and wheat for ration balancing while still practicing the distinct aggregating advantages accruing from use of a rice flake. Buckwheat in either a flaked or puffed form may be employed as the major cereal component in the total cereal mixture; corn, either puffed or flaked and oat groats that are puffed as by gun puffing or air puffing through a fludized bed treatment can also be employed; accordingly, the invention is not restricted to the preferred embodiment of an oat and wheat mixture but a variety of typical cereal grains providing a fortifying and balanced organoleptic mixture may be provided.

The degree of softening for the bumped cereal components is not readily definable but the expression connotes that the oats per se, when immersed in an equal volume of water that is boiling, will be edible when allowed to be brought to a rolling boil, say, in five minutes broadly speaking, more commonly as quickly as two minutes. The preferred characterizing ingredient will be a quickcooking rolled oat product which is essentially an oat groat which has been dehulled, steamed and then thin rolled or bumped, the preconditioning being intended to afford palatability or tenderness as well as digestability.

The agglomerate may also contain a number of alternative ration-balancing cereal protein or protein sources in the above preferred ration; e.g. soy bean curd; wheat germ, rye, corn, milo, sorgum, buckwheat meals and/or flours and mixtures of these ingredients, the range of such ratio balancing cereal proteins being between 0 and 25 parts of the total ration as indicated. Usually these cereal grains or protein sources as in the case of wheat germ or high protein classified wheat flours fractions recovered by sieving or air classification will be selected in accordance with intended nutritional benefits and organoleptic values that are compatible therewith.

Some of the ration balancing agents such as wheat may be pre-treated or modified from original form as by oxidizing through a chlorine-bleaching wash and in turn a tempering operation in the case of whole grains which will be bumped and dried and may subsequently be subdivided, although preferably for substance in the case of rolled whole wheat the wheat will be allowed to remain as such; in this latter preferred embodiment, the wheat grain will be bumped to a point whereat the epidermis or pericarp remaining after dehulling will be broken and the internal starch endosperm will be grossly apparent in the dried bumped form.

The preferred form of matrix-building cereal components. be they oat and wheat mixtures or equivalents, will be in the form of a bumped shape. The process of bumping is practiced after some soaking in cold or warm water to soften the grain; steaming or partial cooking by other means; and subsequent tempering of the cereal grains; whereupon they are flattened and thus opened in structure so that they are more digestible and more readily rehydratable. The act of bumping produces a flattened shape which permits the aggregate to nest or bridge by virtue of the exposed dextrinous character of the surfaces thereof as they undergo tumbling in intimate associate with the puffed flake. Bumping coupled with soaking as in the case of grains such as oats renders the cereal grain more tender or pliable when consumed either dry or wetted and more organoleptically acceptable, particularly when impregnated by added fat which itself tends to soften the eating quality of the grain.

By the use of an oven puffed flake in the amounts disclosed herein, the eventual agglomerate density of the same ration from which the flake is absent will be reduced by at least 10% generally as in the case of bumped cereal components and in the case of other cereal components which may be puffed, the density will be reduced still further. The extent of density reduction to some degree will also be dependent upon the level to which the puffed flakes are used and as the level thereof increases upwardly to, say, 15%, a corresponding though not directly relatable density reduction will be achieved; as one endeavors to reduce density still further by, say, 25%, by increasing the level of cupped flakes, however, the more consequential contribution of the cupped flake will be that of a texture improvement rather than density reduction.

The characterizing flavor and overall taste of the assortment of ingredients will be important, if not paramount, and thus the ability of dried nutmeats to be effectively aggregated and agglomerated together with the grain will determine the ultimate upper level of puffed cupped flakes. The characterizing nutmeats that will be useful in this invention will be, in addition to or in lieu of the preferred diced almonds and dried coconut, chopped walnuts, peanuts, cashews, like-textured vegetable bean extracts or legumes, sesame seeds, sunflower nutmeats, pumpkin seeds in either diced or subdivided and desicated forms, which form may either be infused with flavor or characterizing solutes or may be salted or roasted to suit organoleptic preference.

Having effected an aggregated structure, it will then be appropriate to finally establish that structure by compaction to a slight extent and thereby more intimately aggregate the puffed flakes with the adhering discrete and separate particles of farinaceous and proteinaceous particles aforesaid. Broadly speaking, this compaction will be effected before a final dehydration and the semi-moist matrix of fat and sugar coated particles will usually have a moisture content ranging between 10% - 20% during compacting, more preferably 12% - 15%.

The puffed cupped flake comingled with the bumped cereals permits the aggregate to assume a structure having more spaced points of contact even after compaction. Compaction is controlled so that substantial integrity of the puffed flakes is maintained, it being a preferred embodiment that the degree of compaction after aggregation is controlled so as to minimize the loss of integrity of the puffed flakes as such and thus afford the distinctive eating quality intended for the dried form. The puffed particles will generally assume a more or less randomized position in the compacted aggregate form, although this randomness will to some degree be altered by compaction.

After such compaction and densification, the particles will be subjected to a final dehydration step wherein the aggregate will be dried to a moisture content generally below 5% and above 1%, typically 2% - 3%. Dehydration is preferably carried out under moderately elevated drying air temperatures between 200° - 300° F (dry bulb). Generally, the sensible heat of the circulating drying air will be such that the particles will not be elevated to a temperature above 300° F. whereat incipient pyrolyis and carmelization may occur, since the primary characterizing flavoring constituency of the agglomerate is effected preparatory to formation thereof rather than after; a most preferred sensible heat temperature such as that detected by a thermocouple in a bed of dried particles undergoing terminal dehydration should not exceed 250° F. wherein the dangers of any flavor reactions such as may occur at elevated temperatures are avoided.

Within the ambit of the foregoing processing conditions, the following is a list of preferred ingredients and optimal ranges thereof that will be employed in making the dried agglomerate, expressed in part by weight.

Quick Cooking Rolled Oats (partially gelatinized): 20-35
Rolled Whole Wheat — raw bumped: 2-25
Oven-puffed Rice Flakes: 2-25
Ration-balancing Protein such as wheat germ: 0-25
Almonds: 0-10
Coconut (Dessicated): 0-10
Nonfat Dry Milk: 0-20
Sucrose (including brown sugar): 2-35
Corn Syrup: 0-10
Honey: 0-10
Caramel Flavor: 0-5
Added Fat or Oil, preferably coconut oil: 10-20.

In the foregoing tabulation it will be noted that the oats are quick-cooking rolled oats but in lieu thereof varying levels of other raw or partially gelatinized cereal components may be substituted, it nevertheless being a preferred practice that there be at least 20% of a pregelatinized oat component in the agglomerate.

Preparatory to densification and compaction, the alimentary particles should be sufficiently comixed with the triglyceride and the saccharides as to assure two specific physical conditions. The first will involve a coating of the farinaceous and proteinaceous particles by the fat and to this end the fat will be desirably, through not necessarily, maintained in a more or less liquid if not plastic state to permit some penetration into the grain fractions of the cereal mixture. This enrobing operation provides a textural modification to the cereal particles which is desirable; thus in the preferred practice both oats as well as the wheat and the puffed rice flakes will be coated by liquified flat and will have their textures softened thereby. The fat coating in turn will affect the rehydratability and crispness of the final agglomerate upon use with milk or cream for breakfast cereal application. In this respect, it will be preferred practice to delay and separate the syrup coating step after the initial fat application step a period of time generally at least two minutes and preferably three minutes in order to assure adequate grain penetration through impregnation.

The fat level in the total formula (based on the dried agglomerate) will exceed 15% and more commonly exceed 20% but not to the end of losing the other aforementioned desired organoleptic values; accordingly, a practical upper limit only will be, say, in the order of 30% fat (total fat as determined by acid hydrolysis). As a practical matter, the upper limit will be dictated by both processing and palatability problems and forms no real critical aspect of this invention. In terms of added fat the level in the aggregate will be 10% - 20%, preferably 12% - 15%.

A second and equally important consideration will be essentially a substantially complete coating of all of the amylaceous and protienaceous ingredients by the saccharides aforementioned whether they be in the form of a syrup initially or be converted to that form incident to the act of aggregation. The syrup ultimately produced through liquifaction with water which may be added to the dry powder or which may be present as part of the syrup in the preferred reel-type agglomerating operation serves to provide a more or less continuous envelop which limits any pro-oxidation potential of naturally occurring and unstable fatty materials.

Preferably, the syrups will be such as provides a hard semi-glaze-like coating that does not become sticky when exposed to high relative humidities and will comprise between 60% and 80% soluble solids typically about 70% solids which consists primarily of sucrose and a range of non-sucrose sugar on a dry solids basis of between 1% and 8%. An amount of honey and/or corn syrup solids will be employed in preferred embodiments in order to mitigate crystallization. The syrup will be applied at around 70° Brix and will be fluid enough to be delivered by suitable spray or other coating application equipment known in the arts; generally the degrees Brix is below 75 in order to assure good distribution of syrup providing a complete continuous coating over the particles in the final agglomerate. Commonly the syrup will be elevated to a temperature whereat all of the solids are in solution and the syrup may thereafter be applied after the particles are oilcoated.

The fat and sugar may be applied by alternative coating means, i.e., simultaneously as an emulsion wherein the sugar is dissolved in water and the fat is emulsified therewith. Methods whereby the puffed flakes are aggregated and thereafter agglomerated will be varied depending upon ultimate intended texture. Thus, in one, the triglyceride-coated cereal particles intended for ultimate agglomeration may be comixed with a dry powderous saccharide mixture, e.g. powdered brown sugar, cane sugar crystals and mixtures thereof with corn syrup solids; after co-mixing the materials may be wetted to dissolve the saccharides by a water spray, water addition to the mix or admission to a humid atmosphere of controlled wet and dry bulb thermometry having a high relative humidity and elevated temperature; as a result of these procedures, the saccharides will be partially or totally dissolved and caused to be distributed over the cereal mixture particles and may be further distributed by additional tumbling.

Another alternative may be the "creaming" of the aforesaid powderous saccharides with triglycerides in a plastic state to produce a sugar-cream type of homogeneous mixture. This material will desirably have little or no water added to it and will be whipped or otherwise mixed in a high speed Hobart-type wire whipper mixer to produce a moderate degree of overrun; having produced this low density matrix-forming saccharide-fat mixture, the cereal mixture ingredients will be folded in uniformly to produce a coherent aggregate which with continued mixing again results in the formation of nucleating points as aforesaid, the degree of agglomeration ultimately produceable being a function of the degree of folding which is practiced; the folded agglomerate mass results in a compactable mixture which can be ultimately subjected to a dehydration or baking operation with an optional forming operation to suit choice, typically a 1 inch bed being compacted to, say, a ¾ inch bed and subdivided or broken for sizing to the desired agglomerate.

BEST MODE

The following dry fraction ingredients are weighed and added to a coating reel (multi-flighted) approximately 3 feet in diameter:

Quick cooking rolled oats (8% moisture): 17.7 lbs.
Bumped (rolled) wheat (8% moisture): 3.7 lbs.
Rice "Toasties" (Oven puffed cupped Rice Flakes — 2.5% moisture): 9.1 lbs.
Almonds (diced — 4% mixture): 3.1 lbs.
Unsweetened, dried coconut-4% moisture: 2.9 lbs.
Non-fat Dry Milk-3% moisture: 2.3 lbs.

The dry fraction ingredients are mixed in a coating reel which is operated at 30 – 60 rpm's for 5 minutes. 8.4 Pounds of pure coconut oil at 110° F is poured or sprayed onto the preblended dry fraction ingredients in the rotating reel, and the oil-coated dry fraction resulting is allowed to tumble in the reel for an additional five minutes at the same rpm to insure distribution of oil on the surfaces of the ingredients and impregnation thereof.

Separately a coating syrup having the following ingredients:

Brown sugar (granular) — 2% moisture: 12.3 lbs.
Corn syrup — 42 D.E. — 80% solids: 1.2 lbs.
Honey — solids: 0.7 lbs.
Pure caramel powder — 1% moisture: 0.6 lbs.
Water: 5.7 lbs.

The foregoing coating ingredients are dissolved in water at 150° F. to produce a syrup solution which is poured or sprayed at 150° F. onto the oil coated dry ingredients fraction in the rotating reel, the reel being operated at a range of 30 – 60 rpm's for an additional 5 minutes of tumbling so as to promote uniform coating of the material and particle aggregation.

The oil/syrup coated aggregates are then removed from the coating reel and loaded onto tray-type dryer screens at a moisture content of 13% and a bed depth of ¾ inch to 1 inch, the material being loaded at a level of 10 lbs. per tray having a dimension of 2 inch width and 3 inch length. The material is leveled prior to drying with a metal spatula to induce slight compression and consequent compaction (about 10% reduction in bulk volume). The loaded screens are then placed on a belt-type air circulation dryer wherein the material is dried for 15 minutes using an air temperature of 240° F - 250° with a maximum updraft air flow to produce a semi-dried sheet of 6% - 8%. After completion of passage through the dryer, the product is dumped to a trough and mixed by a spatula to re-expose agglomerates whereafter the product is returned to the dryer screens, releveled, slightly recompacted as in the initial tray loading and run again through the dryer using the same conditions as in the initial run. At the end of this second pass the material is broken apart while still in a warm plastic state, cooled and sized by pressing through wire screen having ¾ inch openings. The sized, cooled agglomerate is then bulk bagged for packaging. The dried agglomerates had a final moisture content after the second drying of 1.5% to 3%. The agglomerates are generally uniform in size and density and have an average size of ⅜ inch diameter with free non-agglomerated particles representing less than 5% by weight; such a product has an average bulk density (free fall) of 26.8 lbs./cu. ft.

The agglomerated cereal mixture can be binned without caking even in high humidity storage, is free-flowing and can be packaged on convention cereal packaging equipment. The agglomerate can be packaged in a conventional cereal carton with a paper-foil type liner; the agglomerates will not cake under normal storage temperatures and humidities. When so packaged the product will remain desirably crisp and multi-textured and will not undergo rancidification after 6 months storage.

Having thus accomplished the desirable objectives of the present invention, a characteristic of the product that is distinctive is the interdependency and cooperative functions that are served by the puffed flake and the fat-sugar coating. It is believed that the fat offers a relatively hydrophobic character which offsets the effects of moisture gain in packaging, particularly at high relative humidity. On the other hand, the sugar in like manner aids in coating the agglomerate substantially continuously so as to minimize the tendency towards the development of a gummy, less crisp cereal mixture eating quality. The puffed flake about which the balance of the cereal mixture is agglomerated offers a multi-texture and crisp eating quality despite the tendency of any such mixture to develop a gummy eating quality with significant gains in moisture on storage. Thus, the blistered or vesicular character of the puffed form serves to impart a higher order of bulk volume and void structure within the agglomerate. The discrete particles of the cereal mixture are randomly arranged in an uncompacted state which aids generally in the preferential eating quality that is experienced when the product is consumed either dry or when wetted with milk and this quality is preserved to varying degrees depending upon the character of the packaging and the storage conditions by the double- or single-coated particles of the mixture. It will thus be understood that although the preferred embodiment of the invention calls for the use of a cupped puffed flake which maximizes the ability of the particles to nest and aggregate, in its broadest aspect of the invention also comprises the use of a puffed flake in any equivalent form in terms of its functionability to achieve such agglomeration while at the same time offering the stated crisp and multi-textured eating quality and stability under varying packaging and storing conditions.

What is claimed is:

1. Process for preparing a dried agglomerated cereal mixture which comprises mixing at least 25% by weight of amylaceous and proteinaceous bumped whole cereal grains, grain by-products of varying particle size and density and a quantity of flaked puffed gelatinized cereal grains having dextrinous surfaces and a lower particle density than the balance of said cereal mixture combined and adapted to receive on the surfaces thereof finer cereal mixture particles upon being wetted; causing a liquified fat to coat and be evenly distributed over the cereal mixture together with a saccharidal syrup having a D.E. of at least 5, continuously tumbling the coated cereal mixture particles until they aggregate to form a heterogeneous cluster of particles adhering around the discrete and separate puffed flakes; and thence drying the aggregates to produce an agglomerated cereal mixture.

2. The process of claim 1 wherein the level of said puffed flakes is 2% - 25% of the dried agglomerated cereal mixture.

3. The process of claim 2 wherein said puffed flakes are oven-puffed.

4. The process of claim 2 wherein said puffed flakes are cupped.

5. The process of claim 1 wherein said puffed flakes are produced by cooking a cereal grain, flaking bumping it and then puffing and toasting it.

6. The process of claim 5 wherein the grain is rice.

7. The process of claim 1 wherein said mixture includes bumped whole grain cereals selected from the class of oat, wheat and mixtures thereof.

8. The process of claim 1 wherein the liquified fat is first coated and evenly distributed over the particles of the cereal mixture to impregnate same and wherein the saccharidal syrup is thereafter coated on the fat-coated cereal mixture to form a continuous coating on the particles of said cereal mixture.

9. Process for preparing a dried agglomerated cereal mixture which comprises mixing at least 25% by weight of amylaceous and proteinaceous bumped whole grains, grain by-products of varying particle size and density, and 2% - 25% of puffed toasted cereal flakes having dextrinous surfaces that have been cooked and bumped preparatory to toasting and are cupped; causing a liquified fat to coat and be evenly distributed over the cereal mixture together with a saccharidal syrup having a D.E. of at least 5; tumbling the coated cereal mixture particles until they aggregate to form a heterogeneous cluster of particles adhering around the discrete and separate puffed flakes; and thence drying the aggregates to produce an agglomerated cereal mixture.

10. The process of claim 9 wherein the cereal mixture particles including the toasted flakes are coated with a liquified fat prior to application of the syrup and wherein the syrup is subsequently applied to coat the fat-coated particles.

11. The process of claim 9 wherein said toasted flakes comprise oven puffed rice flakes.

12. The process of claim 9 wherein said toasted flakes are cooked rice grains that have been bumped to a thickness dimension less than 75% of the cooked grain and then expanded by oven puffing.

13. The process of claim 9 wherein the aggregated clustered cereal mixture particles are compacted preparatory to drying and after coating.

14. The process of claim 13 wherein the clustered cereal mixture particles have a moisture content ranging between 10% and 20% during compaction.

15. The process of claim 13 wherein the compacted aggregates are dried to 1% - 5% moisture with a drying medium temperature below 300° F.

16. The process of claim 13 wherein the fat and saccharides in the syrup are combined into a matrix-forming creamed composition which is then blended to produce said cluster.

17. The process of claim 13 wherein a portion of saccharides is mixed in the dry state as powder with the cereal mixture particles are thereafter liquified in said syrup during coating.

18. The process of claim 9 wherein the syrup contains 1% - 15% of a mono-saccharide.

19. The process of claim 9 wherein the cereal mixture includes at least 20% partially gelatinized rolled oat groats and at least 2% bumped wheat by weight of the dried agglomerated cereal mixture.

20. The process of claim 19 wherein said cereal mixture includes dried nutmeats.

21. The process of claim 10 wherein the saccharidal syrup is applied to and coats the fat-coated cereal mixture particles at a temperature elevated above ambient room temperature and wherein the atmosphere wherein said particles are tumbled is below the temperature of the syrup undergoing said application.

22. The process of claim 21 wherein the coating operation is caused to proceed under conditions wherein the saccharidal syrup is at a temperature above 120° F. and the atmosphere wherein said particles are tumbled is below 120° F.

23. The process of claim 9 wherein said toasted flakes are produced by gelatinizing a rice grain, partially drying it, tempering and warming it to plasticize the rice and then bumping and oven puffing and toasting the bumped flakes.

24. The process of claim 23 wherein the bumped rice flakes are caused to undergo puffing by exposure to atmostpheric or vacuum treatment at a sufficiently elevated temperature to cause rapid evaporation of water.

25. The process of claim 24 wherein the gelatinized rice grain is dried to 15% - 20% moisture content before tempering and wherein the flaked product is subjected to elevated temperatures to induce puffing.

* * * * *

UNITED STATES PATENT AND TRADEMARK OFFICE
CERTIFICATE OF CORRECTION

PATENT NO. : 4,038,427
DATED : July 26, 1977
INVENTOR(S) : Thom O. Martin

It is certified that error appears in the above-identified patent and that said Letters Patent are hereby corrected as shown below:

Column 1, line 31, delete "may" and insert in its place -- many --.

Column 4, line 23, delete "completed" and insert in its place -- complete --.

Column 10, line 11, between "-" and "solids" insert -- 82% --; line 25, delete "inch" and insert in its place -- feet --; line 26, delete "inch" and insert in its place -- feet --; line 53, delete "convention" and insert in its place -- conventional --.

Signed and Sealed this

Twenty-second Day of November 1977

[SEAL]

Attest:

RUTH C. MASON
Attesting Officer

LUTRELLE F. PARKER
Acting Commissioner of Patents and Trademarks